US006092725A

United States Patent [19]

Swartz et al.

[11] Patent Number: 6,092,725

[45] **Date of Patent: *Jul. 25, 2000**

[54] STATISTICAL SAMPLING SECURITY METHODOLOGY FOR SELF-SCANNING CHECKOUT SYSTEM

[75] Inventors: Jerome Swartz, Oldfield; Stephen J. Shellhammer, Lake Grove; Joseph Katz, Stony Brook; Theo Pavlidis, Setauket, all of N.Y.; John Woffinden, Maidenhead, United Kingdom; Judith Murrah, St. James, N.Y.; Edward Beadle, Ridge, N.Y.; Raj Bridgelall, Mount Sinai, N.Y.

[73] Assignee: Symbol Technologies, Inc., Holtsville, N.Y.

[ * ] Notice: This patent is subject to a terminal disclaimer.

[21] Appl. No.: 08/932,779

[22] Filed: Sep. 18, 1997

Related U.S. Application Data

[63] Continuation-in-part of application No. 08/787,728, Jan. 24, 1997, Pat. No. 5,877,485.

[60] Provisional application No. 60/011,054, Jan. 25, 1996.

[51] Int. Cl.[7] .......... G06K 15/00

[52] U.S. Cl. .......... 235/383; 235/380

[58] Field of Search .......... 235/383, 380, 235/375; 705/10, 22

[56] References Cited

U.S. PATENT DOCUMENTS

| | | | |
|---|---|---|---|
| 3,878,365 | 4/1975 | Schwartz | 235/61.7 |
| 4,676,343 | 6/1987 | Humble et al. | 186/61 |
| 4,929,819 | 5/1990 | Collins | 235/383 |
| 5,083,638 | 1/1992 | Schneider | 186/61 |
| 5,115,888 | 5/1992 | Schneider | 186/52 |
| 5,168,961 | 12/1992 | Schneider | 186/52 |
| 5,378,860 | 1/1995 | Dingfelder et al. | 177/25.19 |
| 5,397,882 | 3/1995 | Van Solt | 235/383 X |
| 5,418,354 | 5/1995 | Halling et al. | 235/383 |
| 5,437,346 | 8/1995 | Dumont | 186/61 |
| 5,466,942 | 11/1995 | Oosterveen et al. | 235/383 |
| 5,494,136 | 2/1996 | Humble | 186/61 |
| 5,515,944 | 5/1996 | Cappi et al. | 186/61 |
| 5,543,607 | 8/1996 | Watanabe et al. | 235/383 |
| 5,877,485 | 3/1999 | Swartz | 235/383 |

OTHER PUBLICATIONS

B.W. Lindgren, Elements of Decision Theory. Macmillen Co., 1971.

B.W. Lindgren, Statistical Theory. Macmillen Co., third edition, 1976.

N.M. McCord and W.T. Illingworth, A Practical Guide to Neural Nets. Addison–Wesley, 1990.

"Genetic algorithms archive." http:www.aic.nrl.navy.mil/galist/, no date.

"Manager's Guide to Neural Networks" —Z Solutions "What is Genetic Programming?" Chapter 8 of "Statistical Theory" by Bernard W. Lindgren —Third Edition Chapters 2, 3, 4 of "Elements of Decision Theory" by B. W. Lindgren.

*Primary Examiner*—Karl D. Frech
*Attorney, Agent, or Firm*—Gary Serbin

[57] ABSTRACT

A statistical basis for use in a self-scanning checkout system determines how many items to check in a shopper's shopping cart for incorrect or missing scans as well as which particular or types of items to check to determine if they were properly scanned, if the shopper is determined to be audited. The present invention does not audit every customer, but rather determines whether a given shopper or customer is to be audited on a given shopping trip based upon obtaining a minimum checkout loss for such customer. The methodology determines how many items to check for a given shopper as well as which particular items to check for that shopper. The following factors attempt to model the real world of shopping and may be considered, alone or in varying combinations, in determining the number of items to check for a particular shopping transaction: shopper frequency; queue length; prior audit history; store location; time of day, day of week, date of year; number of times items are returned to shelf during shopping; dwell time between scans; customer loyalty; store shopping activity and other factors. Using statistical decision theory for auditing policies a minimum loss per shopper transaction improves the security and reduces the labor of self-check out without being too intrusive to customers.

17 Claims, 5 Drawing Sheets

A
SHOPPER PRIOR HISTORY
B
STORE LOCATION / DEMOGRAPHICS
F
TYPES OF ITEMS SCANNED
INPUT CRITERIA
C
SHOPPER'S IN CHECKOUT QUES.
E
TIME/DAY SEASON
D
SHOPPER'S SCAN HABITS

STATISTICAL SAMPLING SECURITY METHODOLOGY FOR SELF-SCANNING CHECKOUT SYSTEM

This application is a continuation-in-part of Ser. No. 08/787,728, filed Jan. 24, 1997, now U.S. Pat. No. 5,877, 485, which parent application claims the benefit of U.S. Provisional Application Ser. No. 60/011,054, filed Jan. 25, 1996, assigned to the same assignee as that of the present application, and is incorporated fully herein by reference.

BACKGROUND OF THE INVENTION

This invention relates to self-service shopping, and in particular to a methodology for improving the security of a self-service shopping system by the use of statistical sampling of shoppers and their purchases.

Self-service shopping systems are desired for their ability to offload service-oriented functions from human labor forces and provide automatic assistance to the shopper for increase in response time, efficiency, throughput, lower cost, and the like. For example, systems in the prior art provide each shopper with a portable bar code scanning device, which is used to scan the bar code located on a product in order to determine the price by accessing a locally stored look-up table and keep a tally list of all items selected for purchase. When the shopper is finished selecting items for purchase and scanning the bar codes on the items, he places the self-scanner into a recess in a stationary (i.e., wall-mounted) cradle, wherein a list of items selected is printed out for a receipt and provided to the shopper. The shopper then brings the list along with the cart of selected items to a clerk for tender of final payment and, possibly, an audit of items selected for purchase in order to ensure that all items selected and placed in the cart were properly scanned. This self-service scenario speeds shoppers through the store quicker than the conventional conveyor belt/cashier environment typical in stores today.

Security in a self-service shopping system as described above is a major concern of retailers. Shoppers who fail to scan the bar code of an item placed in their shopping cart will bring the item home without proper payment, whether such failure to scan the item is intentional or inadvertent. In addition, shoppers may scan an item but place a different (i.e. more expensive) item in their cart. Therefore, some methodology of checking shoppers' purchases must be implemented in order to satisfy security criteria.

Two goals of a self-checkout system are to increase shopper throughput and to save in labor costs. Ideally, a shopper can scan his items when selected from the shelf and save scanning time at the checkout line. In addition, stores would require less human labor since there is a reduction in the number of cashiers required. However, there is still a requirement to scan some items from a shopper's cart if a shopper is determined to be audited in order to flag an attempted theft as well as to provide deterrence against pilferage. Thus, some labor is required to scan at least some of the items leaving the store. At one extreme, a system where every shopper has all of his purchase items re-scanned is not feasible since there is no net time savings in such a system (all purchases are scanned by a cashier anyway). There is therefore a need to determine whether a shopper needs to be audited and how many and which items are to be scanned in order to maximize the potential for catching pilferage, provide maximum deterrence against theft, minimize labor costs in checking the shoppers' scanned items, maintain the increased throughput achieved by the self-checkout system, and avoid the negative inferences inherently made by shoppers whose items are checked by an exit cashier or security guard.

Prior art proposals for checkout security require a cashier to check only certain shoppers, but to scan their entire cart full of goods. This type of system is unsatisfactory for those shoppers who are selected for full checking, since they must wait for the entire cart to be re-scanned (thus defeating the purpose of the self-checkout system), suffer potential embarrassment at being singled out by the store for security checking, etc. Thus, an entirely new methodology is needed to supplant this security checking system.

SUMMARY OF THE INVENTION

The present invention proposes the implementation of a statistical basis for use in a self-scanning checkout system for determining whether a shopper or customer should be audited and how many items to check in a shopper's shopping cart for incorrect or missing scans as well as which particular or types of items to check to determine if they were properly scanned. In the present invention, a fraction of the shoppers, depending upon an algorithm, will be checked by a cashier or security guard, but only a limited and select number of items will be checked for each shopper. The present methodology determines how many items to check for a given shopper as well as which particular items to check for that shopper. The following factors may be considered, alone or in varying combinations, in determining the number or type of items to check for a particular shopping transaction: shopper frequency (the number of times the shopper has visited that store), queue length (the length of the checkout line at that time); prior history (check more items if the shopper has had errors in the past, check less items if the shopper has had no errors in the past), store location (check more items in stores located in areas with a high risk of pilferage); time of day, day of week, date of year (determine if pilferage more likely at certain times of day or year); number of times items are returned to shelf during shopping; dwell time between scans, and other factors.

In a method aspect of the present invention, provided is a method for use in a self-service shopping checkout system wherein a shopper is provided with a self-scanning terminal for the scanning of the bar code of an item selected for purchase prior to depositing the item into a shopping cart, and wherein a list of items self-scanned by the shopper is compiled and made available to a cashier for surveillance and payment purposes. The method performs a security check to determine if the shopper did not likely fail to scan an item prior to depositing the item into the shopping cart. The method comprises the steps of determining, as a function of a plurality of input criteria, whether a shopper should be audited and the number of items n to be scanned, selecting from the shopper's cart of items presented for purchase n items to be scanned, scanning a bar code located on each of said n items selected for scanning, allowing the shopping transaction if each item selected for scanning is present on the list of self-scanned items compiled by the shopper, and disallowing the shopping transaction if any item selected for scanning is not present on the list of self-scanned items compiled by the shopper. The number of items n is determined as a function of the criteria mentioned above. The method further comprises the steps of selecting items at random system checks and determining whether more items are needed to be checked until statistical significance is achieved.

In a systems aspect, the present invention comprises several alternative embodiments. In each embodiment, a self-service shopping checkout system comprises a plurality of portable self-checkout devices, wherein each of the self-checkout devices is to be used by a customer to scan a bar code located on an item to be purchased so as to record therein a list of such items to be purchased. In one embodiment, a stationary dispenser unit is used for the releasable containment of said plurality of portable self-checkout devices and transmission of data stored in the devices by wireline to a host computer for processing; and a plurality of point-of-sale terminals using the host processing to check out the customer. In another embodiment, the portable device contains a wireless transceiver for transmitting the data stored in the device directly to the host computer in lieu of storing the data in the device and using the dispenser to transmit the stored data to the computer. In still another embodiment, the portable device is a dumb terminal for collecting and storing the shopping data which may be used in conjunction with a kiosk to determine the prices and cost of items selected for purchase. The kiosk contains a display and a rack for receiving the dumb terminal to communicate with the host computer by wireline or a wireless link. In response to customer inputs, the desired information is presented on the display. Alternatively, the customer may place the dumb terminal in a cradle at the checkout stand. The cradle loads the data in the dumb terminal into the host computer for processing and check out of the customer.

In the present system, each of the portable self-checkout devices comprises bar code scanning means for scanning and decoding a bar code located on an item to be purchased, means for compiling a list of items scanned by said customer, and a data output port for allowing transfer of said scanned item list to an associated data port located in a dispenser external to said portable device or by wireless link directly to a host computer for processing the shopper's items selected for purchase. In one embodiment, the dispenser unit of the system comprises a plurality of device containment slots, each of said slots being configured for releasable containment of a mating self-scanning device, each of said slots having associated therewith a data input port suitable for mating with a data output port located on a portable self-checkout device, and a printer for printing a tally list of items scanned for purchase by said shopper, said tally list being supplied by a self-checkout device after said self-checkout device is returned to a device containment slot after being used by a shopper, said tally list further comprising a bar code encoded with said items scanned by said shopper, a unique identification record associated with said shopper, and the number of items scanned by said shopper. Each of the point-of-sale terminals in the present system comprises bar code reading means for reading said two-dimensional bar code from a tally list presented to a cashier operating said point-of-sale terminal, said bar code reading means providing as output data signals representing said items scanned by said shopper, a unique identification record associated with said shopper, and the number of items scanned by said shopper. Each of the point-of-sale terminals in the present system comprises bar code reading means for reading said two-dimensional bar code from a tally list presented to a cashier operating said point-of-sale terminal, said bar code reading means providing as output data signals representing said items scanned by said shopper, said unique identification record associated with said shopper, and said number of items scanned by said shopper; said bar code reading means also configured so as to scan select items presented for checking by said cashier; means for determining, as a function of said number of items scanned by said customer and an internally stored check number unique to said customer, the number of items n to be scanned by the cashier; means for comparing the identity of the items scanned by said cashier with the list of items scanned by said customer; means for allowing the shopping transaction if each item selected for scanning by the cashier is present on the list of self-scanned items compiled by the shopper; and means for disallowing the shopping transaction if any item selected for scanning by the cashier is not present on the list of self-scanned items compiled by the shopper.

The present invention may be further enhanced using other auditing factors as a basis for statistical techniques for self-check out. Among the audit factors for such self-checkout are shopper audit history, loyalty of shoppers, regional differences and other factors which attempt to model the real world to obtain the minimum checkout loss for a shopper. After a determination whether a shopper should be audited and, if so, how many items should be selected for audit, a shopping transaction is allowed according to a statistical decision if the minimum check-out loss for the transaction is less than a threshold defined by a loss function L(c) and (p), where L(c) is the expected inventory loss associated with the shopper and (p) is the probability of performing an audit on the shopper.

DESCRIPTION OF THE PREFERRED EMBODIMENT

Figure 1:
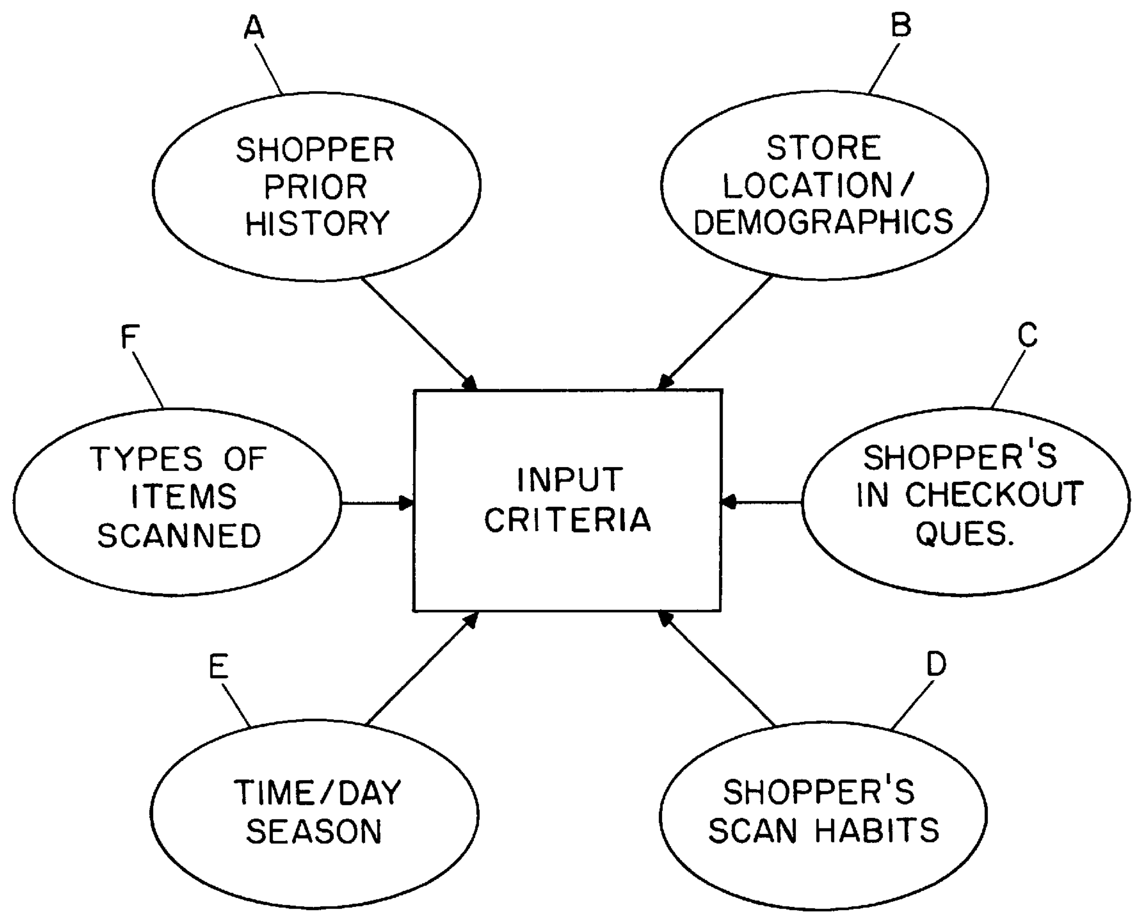
FIG. 1 is a diagram of the input criteria used in the present invention.

In FIG. 1, the present methodology determines how many items to check for a given shopper transaction as well as which particular items to check for that shopper, using the following input criteria which may be considered, alone or in varying combinations: shopper's prior history A (check more items if the shopper has had errors in the past, check less items if the shopper has had no errors in the past); store location and demographics B (check more items in stores located in areas with a high risk of pilferage); number of shopper's in checkout queues or queue length C (the length of the checkout line at that time); shopper's scan habits D or the number of times items are returned to shelf during shopping, and dwell time between scans; time of day, day of week date of year E (determine if pilferage more likely at certain times of day or year); and types of items scanned F. Other factors may include, shopping frequency (the number of times the shopper has visited that store).

Figure 2:
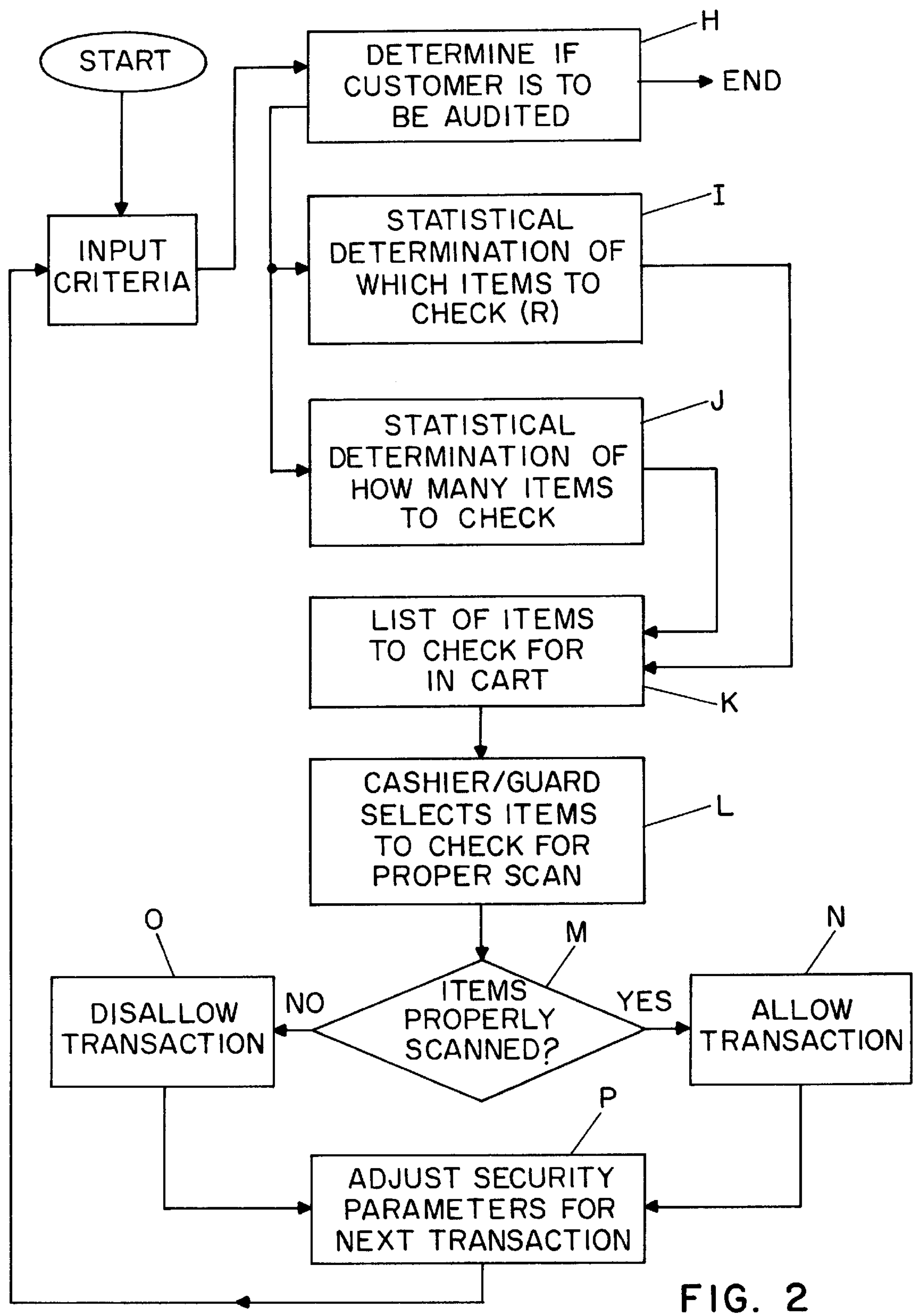
FIG. 2 is a flow chart of the method of the present invention.

In FIG. 2, a method for performing a security check to determine if the shopper did not likely fail to scan an item prior to depositing the item into the shopping cart comprises the steps of G generating a plurality of input criteria for self-check out; H determining if the customer is to be audited, i.e items to be re-scanned; I performing a statistical determination of which items (R) to be selected and scanned; J performing a statistical determination of how many items of the selected items to check in a shopper's basket; K generating a list of items to check; L selecting from the shopper's cart of items presented for purchase n items to be scanned including M the step of properly scanning a bar code located on each of said n items selected for scanning from the chart for proper scanning; N allowing the shopping transaction if each item selected for scanning is present on the list of self-scanned items compiled by the shopper; disallowing the shopping transaction if any item selected for scanning is not present on the list of self-scanned items compiled by the shopper; and P adjusting the security parameters for the next shopping transaction and providing the adjusted security parameters to the input criteria. In an alternate embodiment, the system may advise the cashier or security guard as to the number of items to check in step J without specifying which items to check.

Figure 3:
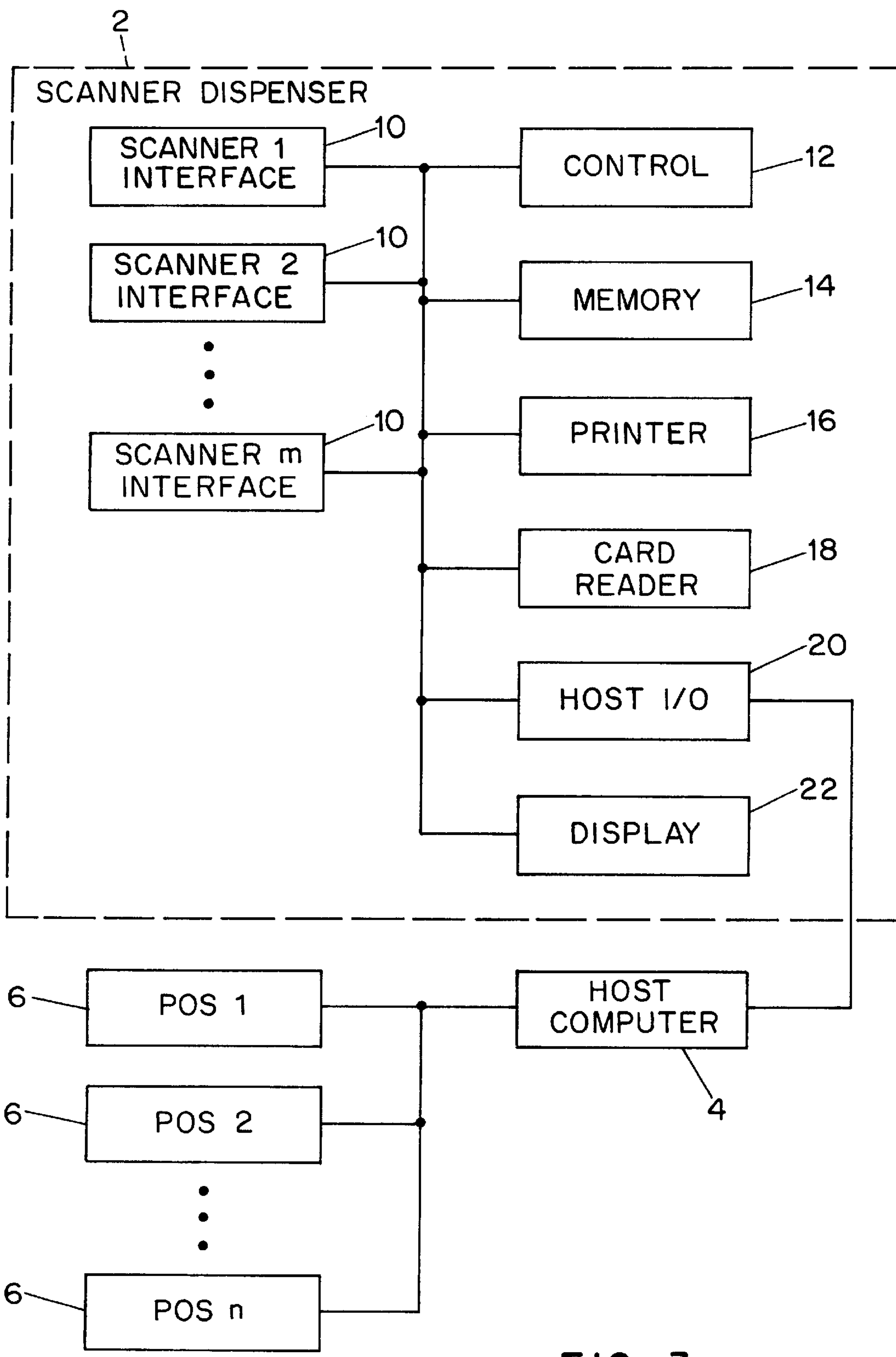
FIG. 3 is a block diagram of the system of the present invention.

FIG. 3 illustrates a block diagram of the secure self-service shopping system of the present invention. The system 2 comprises, at the top level, a scanner dispenser 2, a host computer system 4, and a plurality of point of sale (POS) terminals 6. The host computer 4 is a standard computer system well known in the prior art and found in retail establishments such as supermarkets for controlling operations of the supermarket, as modified as described below to carry out the methods and functions of the present invention. In particular, the host computer 4 is capable of interfacing with the scanner dispenser 2 for data communications therebetween in accordance with the present invention as will be described more fully below. Likewise, each POS terminal 6 is a standard POS computer system well known in the prior art and found in retail establishments such as supermarkets for controlling checkout functions of the supermarket, such as purchase item entry and payment tender functions, as modified as described below to carry out the methods and functions of the present invention. In particular, the POS terminal 6 is capable of interfacing with the host computer 4 for data communications therebetween in accordance with the present invention as will be described more fully below.

Figure 4:
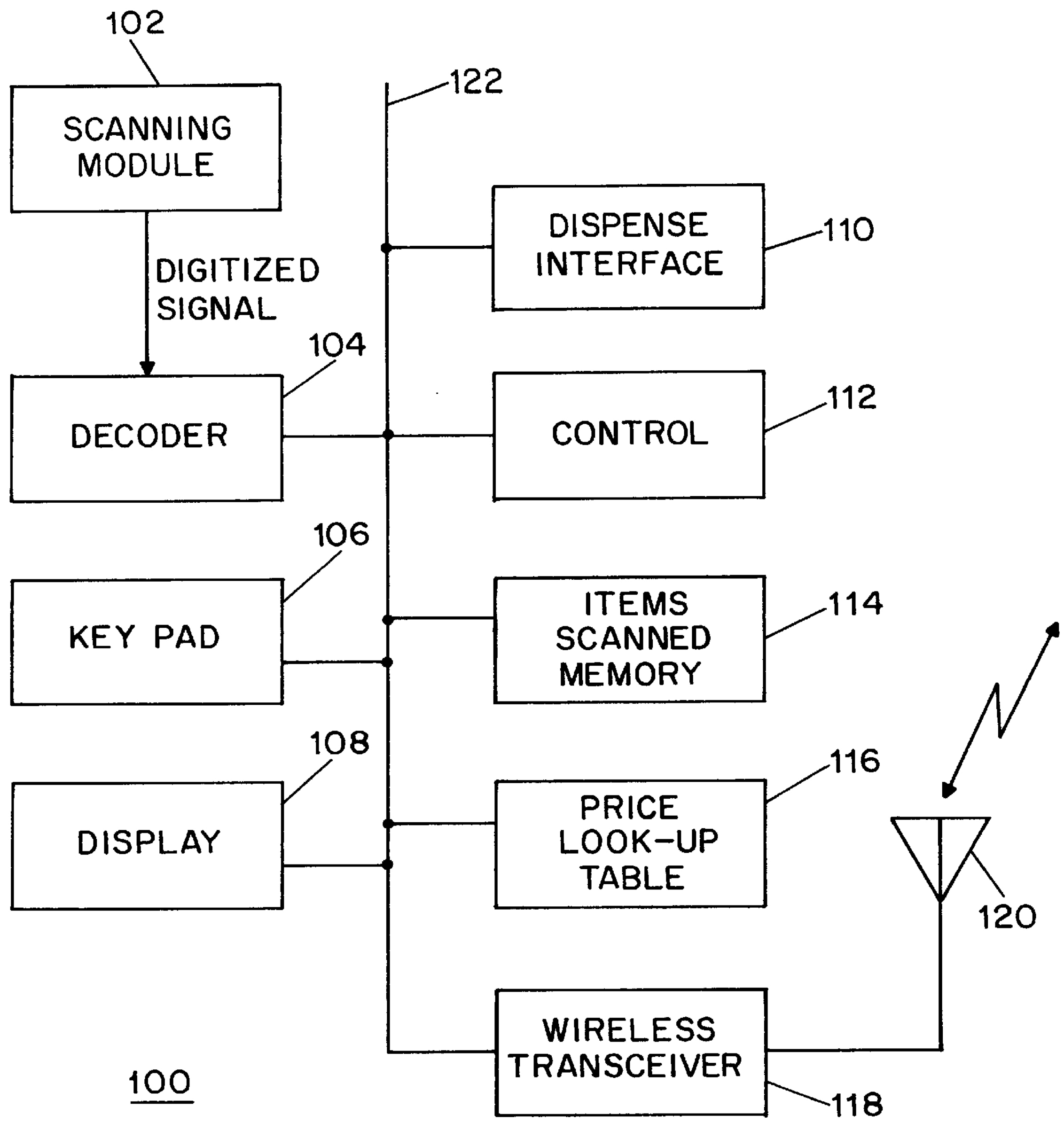
FIG. 4 is a block diagram of the self-scanning terminal of the present invention.

The scanner dispenser 2 is a stationary, i.e., wall-mounted chassis, which comprises a plurality of interface slots 10 configured to physically and electrically mate with an associated portable scanning terminal 100, shown in detail in FIG. 4. Each terminal 100 is placed within an associated recess in the dispenser 2 for data transfer functions, battery recharge, etc., after the shopper has used the scanning terminal for self-service scanning functions. After data has been transferred between the terminal 100 and the dispenser 2, as will be described below, and the terminal power supply (i.e. battery) is deemed to be suitable for re-use, then the dispenser 2 will allow a subsequent shopper to select that terminal for use in his or her shopping functions. The dispenser 2 also comprises a control processing section 12, a memory section 14, a printer 16, a card reader 18, a host I/O section 20, and a display 22, all of which will be described below in further detail.

When a shopper desires to obtain a scanning terminal 100 from the dispenser 2, he accesses the system by presenting a coded identification card to the card reader portion of the dispenser 2. The card reader may be a magnetic stripe reader, which is well known in the art. In this case, the shopper presents a "loyalty card" having an associated encoded magnetic stripe, comprising data indicative of the identity of the shopper. The shopper may also present a credit card, smart card, debit card or the like having a suitable encoded magnetic stripe. In an alternative embodiment, the card reader 18 may be a bar code symbol scanning device, suitable for reading a one or two dimensional bar code symbol printed on a loyalty card, driver's license or the like, for obtaining therefrom the required identification data. Any type of technology which lends itself towards the use of automatic identification may be implemented by this system.

Once the control section 12 of the dispenser 2 has determined that the requesting user is allowed to access a terminal 100 (i.e. the shopper is a member of the self-service shopping system), a terminal is assigned to the user and the identity of the assigned terminal is signaled to the user in any of various ways. For example, an LED associated with and in close proximity to the assigned terminal may be caused to blink on and off, thus catching the attention of the shopper and indicating that he should select that terminal. Likewise, appropriate instructions may be displayed to the shopper via the display 22, such "Please take terminal number 17" or the like. Concurrently therewith, a locking mechanism which may be used for terminal security purposes to prevent unauthorized removal of the terminal will be disabled by the dispenser control logic 12, thus enabling the removal of the assigned terminal 100 from the dispenser 2 by the shopper.

The scanning terminal 100 shown in block diagrammatic form in FIG. 4 is a lightweight, portable, hand-holdable device well suited for carrying by the shopper and performing data entry functions such as keypad entry and/or bar code scanning of items selected for purchase. The terminal 100 comprises a scanning module 102, a decoder 104, a keypad 106, a display 108, a dispenser interface section 110, a control section 112, an items scanned memory section 114, a price look-up table 116, and, optionally, a wireless transceiver 118 and antenna 120, all of which function in operative association with bus 122 as further described.

The scanning module 102 and decoder 104 operate in conjunction in a manner well known in the art to allow the user to scan a bar code located on an item selected for purchase and input onto bus 122 for subsequent processing. For example, in the preferred embodiment, the scanning module 102 is a laser bar code scanner which utilizes a laser light source, a scanning means such as a mirror mounted on a miniature motor, and a photosensor for receiving light reflected from a target bar code and for converting the received reflected light into an electrical signal indicative of the degrees of reflectivity of the various portions of the bar code. The scanning module also comprises signal processing which digitizes the signal from the photosensor so that the decoder may perform an analysis thereon to determine the data represented by the bar code. A laser scanning device such as this is well known in the art and may be found, for example, in U.S. Pat. No. 5,479,000, which is incorporated by reference herein. In addition, the scanning module may be of the CCD type, which utilizes a linear or two-dimensional CCD array for capturing the reflected light (ambient or otherwise) from the target bar code and for generating an associated signal which is processed in accordance with techniques well known in the art.

After the user has scanned a bar code from a target item, the decoded data signal indicative of the data represented by the target bar code is output by the decoder onto the bus 122. The decoded data is used to fetch price and item description information from the price look-up table 116, which is in turn sent to the display 108 for display to the user. The price and description data is also sent to the item scanned memory 114 for storage therein such that the item scanned memory 114 will compile a tally list of all items scanned by the user in that shopping trip.

If desired, the user may delete an item from the tally list by scanning the bar code of the item and depressing an appropriate function key found on the keypad, e.g. a "minus" key, to signal to the control logic 112 that the associated scanned bar code is to removed from, rather than added to, the tally list in the memory 114. Thus, when the user changes his mind about the purchase of an item scanned, he may re-scan the item, press the appropriate return key, place the item back on the shelf, and the tally list will reflect accurately only those items intended to be purchased by the user.

The user may, at any desired time, obtain a subtotal of the items scanned for purchase and resident in memory 114 by depressing an appropriate key on the keypad 106, e.g. a "subtotal" key. This key will cause the control logic section 112 to fetch the price of each item from the memory 114, add the prices together, and display the total on the display 108. This enables the user to ensure that he has not exceeded a certain spending limit.

Figure 5:
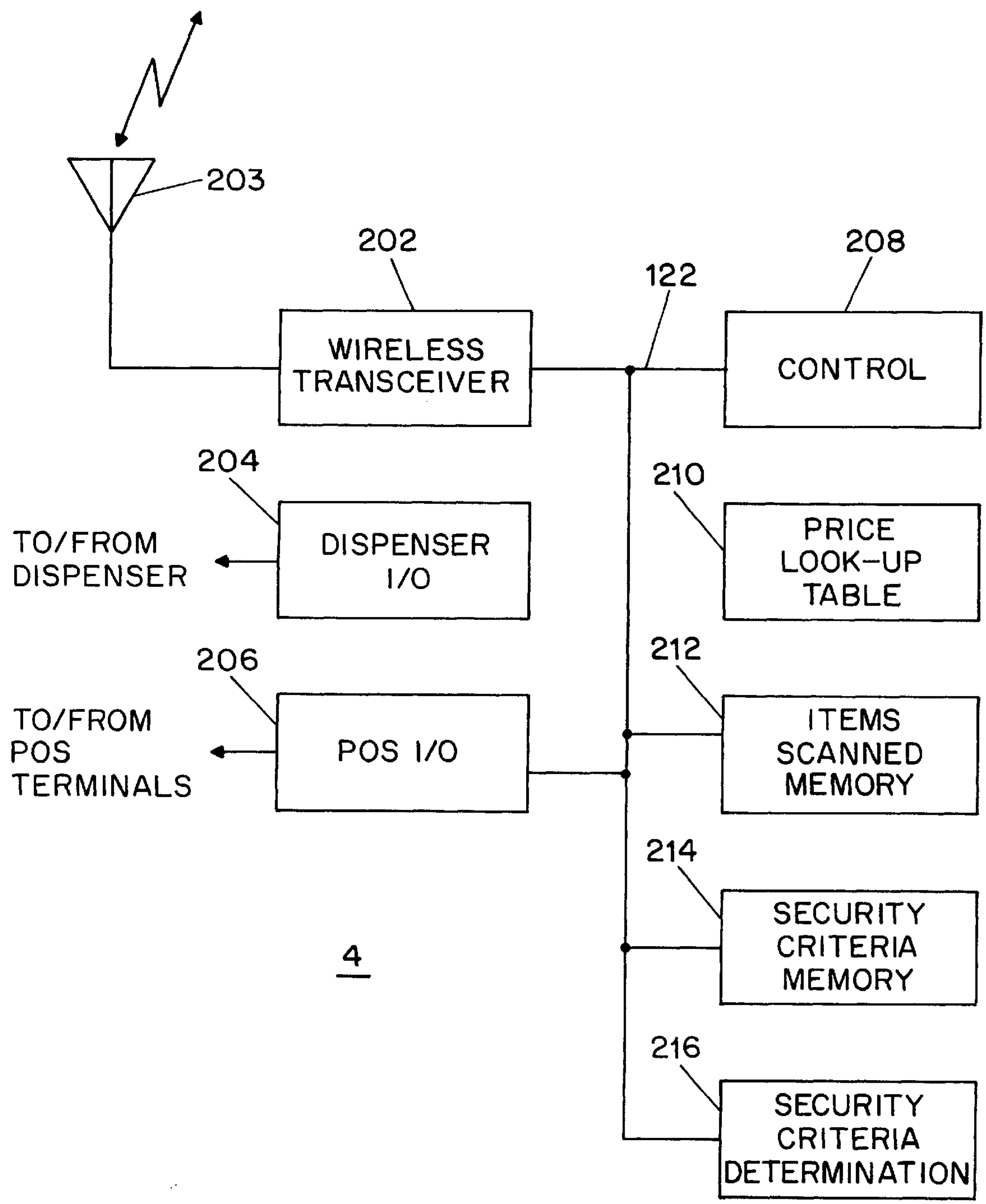
FIG. 5 is a block diagram of the host computer of the present invention.

In another embodiment, as an alternative to looking up the price and description of the scanned item from a terminal-resident memory such as the look-up table 116, the terminal 100 may employ wireless communication with the host computer 4 via the optional wireless transceiver 118 and antenna 120. In such an embodiment, the price and item description information is stored in the price look-up table 210 at the host computer 4, as shown in FIG. 5. The decoded bar code data is sent via the transceiver 118 to the associated antenna 203 and transceiver 202 at the host computer 4, which fetches the price and item description from its price look-up table 210 and sends it back to the terminal 100 via the wireless link. This type of embodiment eliminates the need for a look-up table to be stored in each terminal 100, and changes to the data in the price look-up table may be made at the host rather than requiring each terminal 100 to be revised when the price or item description is changed.

In addition, when a wireless data link is used to allow communications between the terminal 100 and the host 4, then the tally list of items scanned may be kept in an appropriate memory location in the items scanned memory 212 at the host computer 4 rather than utilizing an on-board memory 114. Deletion of an item and acquisition of a subtotal may be likewise executed through the wireless link rather than performing those functions at the terminal 100.

The wireless link may be accomplished via an RF (radio frequency) link, which is well known in the art and is described in detail in U.S. Pat. No. 5,157,687; which is incorporated by reference herein. In an RF based scenario, the host transceiver would likely be physically located near the host since communications with the terminals need not be in close proximity. In the alternative, other wireless technologies such as infrared communications may be implemented, with transceiver stations strategically located throughout the store for communications with each terminal 100 as the shopper proceeds through the store.

In still another embodiment, the terminal 100 may be used in conjunction with a kiosk located in the store to provide the customer for information purposes only a list of the items scanned, the item prices and the cost of purchase. In such case, the terminal 100 maybe a "dumb terminal" and simplified to eliminate costly functions, such as control, display and other functions. The kiosk contains a receptacle for receiving the terminal; a display and a keyboard for communication with the host computer. In use, the terminal would be loaded into the receptacle and the scanned items loaded into the host computer for processing in accordance with customer inputs through the keyboard. The processing results would be shown on the display. The kiosk may communicate with the host computer by wireline or wireless link, as previously indicated. As an alternative, the customer may load the "dumb terminal" into a cradle at the checkout stand whereupon the scanned items would be loaded into the host computer for check-out processing.

Returning to FIG. 3, when the shopper has completed scanning items for purchase, terminal 100 is returned back to the scanner dispenser 2 and placed within an appropriate mating recess for communications with the scanner interface 10. When the terminal has implemented an on-board look-up table 116 and memory 114, then the tally list of items scanned is downloaded from the memory 114 to the host computer 4 for further processing. Along with the tally list, data indicative of the identity of the shopper, which is obtained when the shopper initially requests a terminal 100 from the dispenser 2 as described above, is downloaded to the host 4. The host 4 thusly has stored therein the identity of the shopper along with data indicative of the items selected for purchase. If the system is operating in wireless communications mode, then the items scanned memory 212 at the host computer will contain the tally list of items scanned for purchase for that particular shopper without the need for downloading from the scanning terminal at the dispenser interface.

After determining that the shopper has completed selecting and scanning items for purchase, the host computer proceeds to determine, in accordance with the present invention, the items to be checked by the checkout cashier (or security guard or the like). Referring to FIG. 5, the host computer has stored in a security criteria memory 214 a plurality of security criteria which are used to determine the items to check by the cashier, if the shopper is determined to be audited. The security criteria include, but are not limited to, the following:

1. Shopper frequency: The frequency of visits of the shopper is a factor to consider in determining the number of items to check. A counter is kept in memory for each member of the self-service system, which is incremented every time the shopper has visited the store. In general, the more the shopper has visited the store, the lower the number of items will be checked and the probability of checking the shopper will be lower, since so-called loyal shoppers will be given the benefit of having less items checked.

2. Queue length: The host computer will know the approximate length of the queue by observing the number terminals have been used and returned to the dispenser, but which have not yet been checked out at the POS terminal. Since a goal of the system is to maintain a high throughput of shoppers, it may be postulated that less items will be checked when the queue length is long.

3. Prior history: The specific prior history of the particular shopper is stored and used to factor in the determination of the number of items to be checked. That is, shoppers with a prior history of scanning errors, as determined by the security check at the POS terminal, will have more items checked than shoppers with less errors in the past and the probability of re-scanning items of such shopper is higher.

4. Store location: Demographic indicia linked to the likelihood that pilferage will occur more frequently in a certain geographic location may be factored into the determination of the number of items to be checked.

5. Time of day/ day of week/ date of year: Statistical analysis of pilferage as it may be linked to the time of day, day of week or date of year may be factored into the determination.

6. Item returns: The host computer will have information available to it as to the number of times a shopper has depressed the minus key, which indicates a scanned item has been returned to the shelf. A likelihood exists that a shopper who has depressed this key an excessive amount of times is more likely to have failed to actually return the item to the shelf. Thus, the number of items to be checked should increase as this factor increases. This factor increases the probability of re-scanning and the number of items to be checked.

7. Dwell time between scans: The elapsed or dwell time between scans by the shopper may be examined by time-tagging the scans and analyzing the shopping pattern. Thus, for example, it may be statistically determined that shoppers should scan an item once every minute. When a shopper takes five minutes to scan the next item, it may be presumed that items may have been selected for purchase but not scanned in that interim. Those shoppers with inordinate dwell times may have more items checked.

After the host computer 4 has used the security criteria as described above in order to ascertain, via the security determination logic means 216, the specific number of items to check for scan accuracy by the cashier or security guard, it proceeds to determine if this shopper is to be re-scanned (audited) or not, and if so, which types of items the cashier or security guard should look for in selecting the items to check. Factors to consider in determining which items to look for from among the shoppers purchases include the following:

1. Statistical determination of highly pilfered items: Historically, certain items such as batteries or razors (high cost, small package size) have a higher percentage of pilferage than other items such as watermelons (low cost, large package size).

2. Prior history: The specific prior history of the particular shopper is stored and used to factor in the determination of which items should be checked. That is, shoppers with a prior history of scanning errors for certain items, as determined by the security check at the POS terminal, will have those particular items checked.

3. Store location: Demographic indicia linked to the likelihood that pilferage of certain items will occur more frequently in a certain geographic location may be factored into the determination of the specific items to be checked.

4. Time of day/ day of week/ date of year: Statistical analysis of pilferage of certain types of items as it may be linked to the time of day, day of week or date of year may be factored into the determination.

5. Item returns: The host computer will have information available to it as to the number of times a shopper has depressed the minus key for certain items, which indicates that scanned item has been returned to the shelf. A likelihood exists that a shopper who has depressed this key an excessive amount of times is more likely to have failed to actually returned the item to the shelf, and thus that item should be checked.

6. Dwell time between scans: The elapsed or dwell time between scans by the shopper may be examined by time-tagging the scans and analyzing the shopping pattern. Thus, for example, it may be statistically determined that shoppers should scan an item once every minute. When a shopper takes five minutes to scan the next item, it may be presumed that items may have been selected for purchase but not scanned in that interim. By analyzing the store location as a function of dwell time increase (by checking adjacent scans and extrapolating the interim location of the shopper), it can be determined which items should be checked.

Once the analysis has been made by the host computer as to which specific (or types of) items should looked for by the cashier or security guard, then data indicative thereof is stored along with the number of items to be checked for that shopper in the memory of the host computer 4. This data is available for download to the appropriate POS terminal selected for final checkout by the shopper after he has resumed the scanning terminal 100 to the dispenser 2.

The shopper may then proceed to an appropriate POS terminal 6, which is manned by a cashier for tender of payment and security checking of the items selected for purchase. When the shopper reaches the POS station, he presents his loyalty card (or other suitable automatic identification card) to the cashier, who will present the card to an appropriate card reader for automatic identification of the shopper. The shopper's identification data is used to fetch from the host computer 4 the tally list of items scanned and the data indicative of the number of items to be checked as well as the identity of specific items or types of items to look for in performing the audit process.

The cashier or security guard reads from the display at the POS terminal the list of items to check (or from a printed version of the list) and selects the items for checking. The cashier scans the bar code of each item, and if any item scanned is not on the tally list, the cashier or security guard is alerted that the shopper has made an error in scanning. In this case, the retail establishment may opt to re-scan the entire shopping cart, may simply add the item to the tally list, or may take some other act it deems appropriate for the situation. Data indicative of the mis-scanned item is then transmitted from the POS terminal back to the host computer and stored in its security criteria memory 214 for subsequent processing and subsequent criteria determination.

Additional Self Checkout Auditing Processes or Policies

A more advanced auditing policy will increase security and further reduce labor. Many factors can be used in developing such a policy. Some of the factors that can be used in an advanced auditing policy are listed hereinafter in Section A. How these factors are taken into account by a system operator determines the auditing policy. Several auditing policies are proposed. One policy is based on statistical decision theory and is described in Section B1. A policy based on different customers response to auditing is given in Section B2. A policy based on Neural Networks is described in Section B3.

A. Factors used in an Advanced Auditing Policy

There are many heuristic rules that can be applied in an auditing policy. In the prior art there is one implicit rule. The rule can be stated something like this: People who have failed an audit (either due to theft or due to innocent errors) are more likely to do so in the future, therefore they should be audited more often. To develop a better auditing policy we need to use additional rules that model the real world more completely.

In this section we summarize the rules that will be used in subsequent sections to develop advanced auditing policies. The following is a list of the rules and a short description of each.

Audit History:

The audit history of a given customer is a good indication of his future checkout accuracy. One may use the recent audit history or possibly the entire audit history. This is the rule used in the prior art.

Loyal Customers:

Customers who shop frequently at the store are likely more honest and should be audited less. Some of this falls out from the previous rule; however, we may want to give the loyal customer an additional level of trust and further reduce the audit frequency.

Regional Differences:

Different regions of the country or the world will have different likelihood of theft. Regions with a high theft level may require more stringent security so the level of auditing should be higher in those regions.

Store Shopping Activity:

To reduce waiting a long time in audit lines the store may want to reduce the average auditing level during times when the store is very busy. This will increase the throughput of the store at the risk of slightly increased theft.

Weight & Size of Items:

These qualities may be factor in the rate of pilferage.

Seasonal:

During different seasons people may be more likely to attempt theft or make errors.

Time of Day:

During different times of the day people may be more likely to attempt theft or make errors.

High Rate of Returns:

If the customer is deleting a lot of items from the checkout list he may be more likely to be attempting theft.

Scan Frequency:

Long time spans between scan items could be an indication of attempted theft.

B1. Statistical Decision Theory Based Auditing Policy

The approach taken here is to use statistical decision theory to implement an auditing policy based in whole or in part on the above rules. A description of statistical decision theory is given in Appendix I, references [1, 2].

The first parameter that is required in setting up a decision rule is a description of the state space, which is the set of possible states of nature [2]. This is all the information that we have at our disposal to make a decision. The state space, $\theta$, which we will use consists of a finite set of possible events that can occur. As an example we will consider a state space of four events which consist of all combinations of two independent events. The first event to consider is whether there is an error in the self checkout that was performed by the customer. This event, $E \subset \theta$, represents an error in the self checkout data; its complement $\bar{E} \subset \theta$, means there is no error. The second event indicates whether the store is busy or not. The event, $B \in \theta$, means the store is busy and the event $\bar{B} \subset \theta$ means the store is not busy.

Taking combinations of E, $\bar{E}$, B, and $\bar{B}$, the state space can be partitioned into four mutually exclusive events, $$\theta = \{\theta_1, \theta_2, \theta_3, \theta_4\} \quad (1)$$

where the states are as follows, $$\theta_1 = E \cap B$$

$$\theta_2 = \bar{E} \cap B$$

$$\theta_3 = E \cap \bar{B}$$

$$\theta_4 = \bar{E} \cap \bar{B} \quad (2)$$

So $\theta_1$ means that the customer has made an error in his checkout and the store is busy, $\theta_2$ means self checkout is correct and the store is busy, etc.

In developing a decision rule we also need to define the possible actions that we can take. Since we are trying to determine whether to audit a customer or not, our actions involve levels of auditing. Each time a customer shops at the store we have several options. We can let the customer leave without an audit, we can audit the customers entire cart, or we can perform a limited audit by checking only some of the items the customer has in his cart.

For this example, we will consider a action space consisting of these three actions, $$A = \{a_1, a_2, a_3\}. \quad (3)$$

The three actions are, $a_1$: No Audit $a_2$: Limited Audit (e.g. check 10% of items)

$a_3$: Full Audit (4)

Finally, we need to define a loss function associated with taking action $a_i$ given that event $\theta_j$ occurs. This loss function measures the loss (either financial or otherwise) incurred by taking such an action. In the self checkout problem there are several factors that effect loss. First, there is the actual loss incurred due to theft. There is a loss associated with a low throughput of customers that may incur due to excessive auditing during busy times. There is the labor costs associated with performing the audit. And finally, there is loss associated with customer dissatisfaction due to excessive auditing or having to wait a long time.

As an example, Table 1 lists the different losses that occur. The actual values for that table would depend on what store this system is being used in and could be adjusted to fit their circumstances. Combining the losses listed in this table it is possible to build a loss function. As an example, loss function $L(\theta, a)$ is given in Table 2.

Lets see in Table 2 how the loss function is built up from the losses in Table 1. For example, whether the store is busy or not, there is an average inventory loss of $5.00 if the customer has made an error in his self checkout and we chose not to audit. If he has not made an error and we do not audit then their is no loss since there is no error to find. There are no other types of losses when you do not perform an audit. If the store is busy and we chose to do a limited audit, and the customer made an error, then we have a $2.00 loss of inventory, a $0.50 loss in potential sales, a loss of $0.50 in labor costs, and finally a loss of $0.50 in customer dissatisfaction. Under the same conditions, except that the customer did not make an error, then we have all the same losses, except the $2.00 loss of inventory. The other terms of the loss function are developed in a similar manner. So in this loss function we have summarized the four types of loss: inventory loss, potential sales loss, labor costs, and customer dissatisfaction.

Now, given the state space, the action space, and the loss function we need a criterion for selecting the "best" action. We choose to select the action that gives the smallest loss on the average. We cannot be guaranteed to always select the smallest loss because we do not know if the customer has made an error (if we did it would make the audit decision very easy). This lack of knowledge can be modelled statistically. We model the events in the state space as random and with some distribution as to their likelihood. Now in the state space we have set up there are two factors: whether the customer has made an error and whether the store is busy. The first is an unknown and the second is know. So in this case all we have to model as random are the events E and $\bar{E}$.

There are many possible models that could be used to represent this probabilistically. For example, it could change with time and other factors. We will make the simple assumption

TABLE 1

Different Losses Occurring In A Loss Function

| Loss | Value |
|---|---|
| Inventory loss when no audit is performed and customer made an error | $5.00 |
| Inventory loss when limited audit is performed and customer made an error | $2.00 |
| Inventory loss when full audit is performed | $0.00 |
| Potential sales lost when store is busy and full audit is performed | $1.00 |
| Potential sales lost when store is busy and partial audit is performed | $0.50 |
| Potential sales lost when store is not busy and partial audit is performed | $0.25 |
| Potential sales lost when no audit is performed | $0.00 |
| Labor costs for full audit | $1.00 |
| Labor costs for partial audit | $0.50 |
| Labor costs for no audit | $0.00 |
| Customer dissatisfaction with full audit when store is busy | $1.00 |
| Customer dissatisfaction with partial audit when store is busy | $0.50 |
| Customer dissatisfaction with full audit when store is not busy | $0.50 |
| Customer dissatisfaction with partial audit when store is not busy | $0.25 |
| Customer dissatisfaction with no audit | $0.00 |

TABLE 2

Types of losses and their financial value

| | | $\theta_1 = E \cap B$ | $\theta_2 = \overline{E} \cap B$ | $\theta_3 = E \cap \overline{B}$ | $\theta_4 = \overline{E} \cap \overline{B}$ |
|---|---|---|---|---|---|
| $a_1$ | (No audit) | 5.0 | 0.0 | 5.0 | 0.0 |
| $a_2$ | (Limited Audit) | 3.5 | 1.5 | 3.0 | 1.0 |
| $a_3$ | (Full Audit) | 3.0 | 3.0 | 2.0 | 2.0 |

that for each customer there is a probability that he will make and error and that probability is fixed. Later we could use a more elaborate model. So for a given customer we will define the $p_e$ as that probability of making such an error, $$p_e = P(E) = 1 - P(\overline{E}) \tag{5}$$

If we know this probability (and actually we have to estimate it) we can use it to find the best action. To do this we have to define the Bayes loss [2] as the average loss, $$B(a) = E[l(\theta, a)] = \sum_{i}^{n} L(\theta_i, a)P(\theta_i). \tag{6}$$

where L represents loss which is a function of types of losses and the auditing decision of Table 2.

Since we can assume that we know whether the store is busy or not we can simplify this formula. If the store is busy we have, P(B) =1 and P(B)=$\overline{B}$. So, $$B(a) = L(\theta_1,a)P(\theta_1) + L(\theta_2,a)P(\theta_2) + L(\theta_3, a)P(\theta_3) + L(\theta_4, a)P(\theta_4)$$

$$B(a) = L(\theta_1,a)P(E) + L(\theta_2,a)P(\overline{E})$$

$$B(a) = L(\theta_1, a)p_e + L(\theta_2, a)(1 - p_e) \tag{7}$$

And if the store is not busy we have, P(B)=0 and P($\overline{B}$)=L. So, $$B(a) = L(\theta_1,a)P(\theta_1) + L(\theta_2,a)P(\theta_2) + L(\theta_3, a)P(\theta_3) + L(\theta_4, a)P(\theta_4)$$

$$B(a) = L(\theta_3,a)P(E) + L(\theta_4,a)P(\overline{E})$$

$$B(a) = L(\theta_3, a)p_e + L(\theta_4, a)(1 - p_e) \tag{8}$$

The best action to take is the action that minimizes the Bayes loss [2]. That action is called the Bayes action, $a_B$, $$B(a_B) = \min_j B(a_j) \tag{9}$$

We will now show how to get the probability of this customer making an error. We will use our prior audit history to estimate that probability. The simplest estimator is just the relative frequency. If the customer has been audited $N_a$ times and has failed the audit (i.e. had an error) $N_e$ times then we can estimate the probability of an error as the ratio of those two numbers, $$\boxed{\hat{p}_e = \frac{N_e}{N_a}} \tag{10}$$

We may choose to only use the recent audit history so that if $p_e$ has changed recently we can detect it. If we want to do that then we use only the last 10 audits for example, and then $N_a$=10 and $N_e$ is the number of errors in those audits.

In summary, one estimates $p_e$ using Equation 10. If the store is busy one uses Equation 7 for the Bayes loss, substituting $\hat{p}_e$ for $p_e$, $$\boxed{B(a) = L(\theta_1, a)\hat{p}_e + L(\theta_2, a)(1 - \hat{p}_e)} \tag{11}$$

If the store is not busy one uses Equation 8 for the Bayes loss, substituting $\hat{p}_e$ for $p_e$, $$\boxed{B(a) = L(\theta_3, a)\hat{p}_e + L(\theta_4, a)(1 - \hat{p}_e)} \tag{12}$$

Select the Bayes action, $a_B$, that minimizes the Bayes loss as in Equation 9, $$\boxed{B(a_B) = \min_j B(a_j)} \tag{13}$$

In the example given here only two variables were considered: the customer making an error and whether the store is busy. Clearly the other factors listed in Section A.2 can all be included in the auditing policy. This involves having more variables in the loss function. Note, however that the only unknown is whether the customer has made an error. So the only probability that has to be estimated is the probability of such an error. All other parameters of the loss function would be known to the system. For example, the system would know whether it was being used in a safe neighborhood or not. So the calculation of the Bayes action would still be quite simple.

In this example we have made a number of simplifications. For example, we have described the business of the store as either busy or not busy. We could easily have many levels of how busy the store is and define a loss function that takes into account all those different levels.

Using statistical decision theory we always select the action that gives the lowest average loss. From a mathematical point of view this is the optimum thing to do. However, if a customer has a relatively fixed probability of error and visits the store under similar conditions every time (e.g. level of business) then it is likely that we will take the same action most of the time. This may not be the best thing to do from a psychological point of view. The customer may start to try to second guess the system and change his actions. For this reason we may want to randomize our actions a bit. One way to do this is to assign a probability of performing each action and then select the action according to that probability law. Let us define $p_i$ as the probability of taking action $a_i$. Then one way to select those probabilities so that they are inversely proportional to the loss associated with taking that action, $$p_i = \frac{1/B(a_i)}{1/B(a_1) + 1/B(a_2) + 1/B(a_3)} \qquad \text{For i = 1, 2, 3.} \tag{14}$$

Then we take action $a_i$ with probability $p_i$. This may not be the optimum from a mathematical point of view but it may be better from a psychological point of view.

B2. Audit Policy Based on Customer's Response to Audit

Another approach that can be taken in developing an auditing policy is to quantify the customers reaction to being audited and use his reaction to govern your audit policy.

To illustrate this idea we will define A as the cost of performing an audit. Let L(c) be the expected inventory loss associated with customer c if an audit is not performed. This expected loss takes into account both the average loss if an error is made and the probability that he will make an error. The objective of this auditing policy it to select a probability of performing an audit to minimize the average overall loss. Then once that probability is calculated an audit is performed with that probability. Let the probability of performing an audit be Pa. If the loss is independent of the probability of performing an audit then the average loss is given by, $$L_{ave} = p_a A + (1-p_a) L(c). \tag{15}$$

This is easy to see since you perform an audit with probability $p_a$ and when you do it costs A; similarly you skip an audit with probability $(1-p_a)$ and it costs L(c) each time. So we have just averaged those two possibilities.

What if L(c) is also actually a function of the audit probability? Then we write the inventory loss as a function of both the customer and the frequency of auditing, so the loss has two parameters: L $(c,p_a)$. There are many possible functions that can be used to model the customers response to being audited. For example, many customers will be more likely to make less errors if they are audited, whereas others may continue to make errors even if audited frequently. Let us try the following loss function, $$L(c,p_a) = B(c)(1-p_a)^n \tag{16}$$

where B(c) is the loss when the customer is never audited and n is positive integer. The larger n the more likely the customer will make less errors when audited frequently. So a loss function with a large value of n models a customer who is highly deterred from making an error by the threat of an audit. This can be seen by noticing that for large n the loss, L(c), drops off faster with an increase in $p_a$. In this way we can model different customers response to being audited.

Given this formula for $L(c,p_a)$ we can select $p_a$ to minimize the average loss. Substituting this new inventory loss function into Equation 15 for average loss we get, $$L_{ave} = p_a A + (1-p_a) L(c,\ p_a)$$

$$L_{ave} = p_a A + (1-p_a)^{(n+1)} B(c). \tag{17}$$

To minimize this we differentiate with respect to $p_a$ and set it equal to zero, $$A - (n+1)(1-p_a)^n B(c) = 0 \tag{18}$$

which can be solved for the probability, $$p_a = 1 - \left(\frac{A}{(n+1)B(c)}\right)^{1/n} \tag{19}$$

Since a probability must be nonnegative we must have, $$A < (n+1)B(c) \tag{20}$$

and if we do not satisfy that equation we should just set $p_a=0$. Thus Equation 19 gives the formula for the optimum audit probability.

In Equation 15 the only probability density function was $p_a$. If the losses A and L were also random we can generalize Equation 15 by averaging over those distributions also, $$L_{ave} = \int\int (p_a A + (1-p_a) L(c)) p(a) p(l)\, da\, dl \tag{21}$$

where p(a) is the probability density function of A and p(l) is the density function of L. Then the same procedure as above is applied to find the best auditing probability.

B3. Artificial Neural Network Based Auditing Policy

Artificial Neural Networks have been applied to sales forecasting, industrial process control, customer research, data validation, risk management, target marketing, medical diagnosis and other problems were the system transfer function depends in the input variables, and changes over time. For example, Mellon Bank installed a neural network credit card fraud detection system and the realized savings were expected to pay for the new system in six months. See Appendix I, references [3, 4]. Essentially, a Neural Network is used to learn patterns and relationships in data. The data here can be information about the customer and the output can be whether or not the customer is to be audited.

The input variables may be fuzzified. For example, the customer's age may be fuzzified to {teenager, young, middle aged or aged.} The shape of the membership functions may be learned and generated via a neural net in order to minimize some cost function—usually from a teacher (expert). The fuzzy rule base may also be adaptable over time. Genetic Algorithms may be applied to this rule base such that rules that work well will mutate and spawn children that will perform better over time. See Appendix I, reference [5]. References on Genetic Algorithms may be found in texts that describe "Evolutionary Programming" concepts.

Summarizing, the advanced auditing policies of the present invention, as reflected in the auditing rules which model the real world and statistical decision theory based auditing, is not to audit every customer. Instead, the present invention determines whether a given shopper or customer is to be audited on a given shopping trip based upon obtaining a minimum checkout loss for such customer thereby providing an audit policy which is not too intrusive to customers or shoppers, but which is a significant deterrent to theft and unintentional errors.

Appendix 1

References

[1] B. W. Lindgren, Elements of Decision Theory. Macmillen Co., 1971.

[2] B. W. Lindgren, Statistical Theory. Macmillen Co., third ed., 1976.

[3] Z. Solutions, "An introduction to neural networks." http://www.mindspring.com/zsol/mgrguid.html.

[4] N. M. McCord and W. T. Illingworth, A Practical Guide to Neural Nets. Addison-Wesley, 1990.

[5] "Genetic algorithms archive." http://www.aic.nrl.navy.mil/galist/.

It should be apparent to those skilled in the art that while the invention has been described with respect to a specific embodiment, various changes may be made therein without departing from the spirit and scope of the invention as described in the specification and defined in the claims.

We claim:

1. A method for enhancing the accuracy and reducing audit level of a self-checkout system while achieving a lowest average loss for a customer in a system wherein a customer selects a plurality of items for purchase and registers the plurality of items with a portable terminal, comprising the steps of:

a) generating at least one state space of possible events that may occur in a self-checkout by a customer;

b) generating at least one action space in response to each state space;

c) generating a loss function in response to each action space; and d) auditing a self-check out to obtain a minimum checkout loss for a customer.

2. The method of claim 1 wherein the state space is a statistical representation of possible events (E) that may occur in a self-checkout.

3. The method of claim 1 wherein the action space is a statistical representation of possible actions that may be taken in response to the possible events.

4. The method of claim 1 wherein the loss function measures a loss resulting from an action.

5. The method of claim 1 further comprising the step of determining and defining an average loss for a self check-out as a Bayes loss.

6. The method of claim 5 where the Bayes average loss is given by the equation:

$$B(a) = E[l(\theta, a)] = \sum_{i}^{n} L(\theta_i, a)P(\theta_i)$$

where $\theta_i$ represents random events.

7. The method of claim 1 wherein the loss function is a function of L(c) and p where L(c) is the expected inventory loss associated with a shopper (c) and p is the probability of performing an audit on the shopper.

8. In a self-service shopping checkout system wherein a shopper is provided with a portable self-scanning terminal for scanning of a bar code of an item selected for purchase prior to depositing the item into a shopping cart, and wherein a list of items self-scanned by the shopper is compiled and made available to a cashier for surveillance and payment purposes, the improvement comprising a method for enhancing the accuracy and reducing overall audit level and achieving a lowest average loss of a self-checkout system wherein a customer selects a plurality of items for purchase and registers the plurality of items with the portable terminal, comprising the steps of:

a) determining if the customer is to be audited to obtain the lowest average loss for the customer using statistical decision analysis;

a) determining, as a function of a plurality of input criteria, the number of items n to be scanned;

b) selecting from the shopper's cart of items presented for purchase n items to be scanned;

c) scanning a bar code located on each of said n items selected for scanning; and d) allowing the shopping transaction if each item selected for scanning is present on the list of self-scanned items compiled by the shopper.

9. The method of claim 8 further comprising the step of disallowing the shopping transaction if the minimum check-out loss exceeds a threshold.

10. A self-service shopping checkout system comprising:

a) a plurality of portable self-checkout devices, each of said self-checkout devices to be used by a customer to scan a bar code located on an item to be purchased so as to record therein a list of such items to be purchased, each of said devices comprising bar code scanning means for scanning and decoding a bar code located on an item to be purchased, means for compiling a list of items scanned by said customer, and a data output port for allowing transfer of said scanned item list to an associated data port located external to said portable device;

b) a stationary dispenser unit for the releasable containment of said plurality of portable self-checkout devices, said dispenser unit comprising:

(i) a plurality of device containment slots, each of said slots being configured for releasable containment of a mating self-scanning device, each of said slots having associated therewith a data input port suitable for mating with a data output port located on a portable self-checkout device; and (ii) a printer for printing a tally list of items scanned for purchase by said shopper, said tally list being supplied by a self-checkout device after said self-checkout device is returned to a device containment slot after being used by a shopper, said tally list further comprising a two-dimensional bar code encoded with said items scanned by said shopper, a unique identification record associated with said shopper, and the number of items scanned by said shopper;

c) a plurality of point of sale terminals, each of said point of sale terminal comprising:

(i) bar code reading means for reading said two-dimensional bar code from a tally list presented to a cashier operating said point of sale terminal, said bar code reading means providing as output data signals representing said items scanned by said shopper, said unique identification record associated with said shopper, and said number of items scanned by said shopper; said bar code reading means also configured so as to scan select items presented for checking by said cashier;

(d) means for generating at least one state space of possible events (E) that may occur in a self-checkout by a shopper;

(e) means for generating an action space in response to each state space;

(f) means for generating a loss function in response to each action space; and (g) means for auditing a self-check out to obtain a minimum checkout loss for a customer.

11. A method of selecting a best action for auditing a customer in a self-check out system comprising the steps of:

a) generating at least one state space of possible events that may occur in a self-checkout by the customer;

b) generating at least one action space in response to each state space;

c) generating a loss function in response to each action space; and d) selecting the action that gives the smallest loss function on the average.

12. A method of selecting a best action for auditing a customer in a self-check out system comprising the steps of:

a) generating at least one state space of possible events that may occur in a self-checkout by the customer;

b) generating at least one action space in response to each state space;

c) generating a Bayes' loss function in response to each action space; and d) randomly selecting the action with the probability inversely proportional to the Bayes' loss associated with taking that action.

13. A method of selecting a best action for auditing a customer in a self-check out system comprising the steps of:

a) determining if the customer is to be audited for items on a given shopping trip based upon a lowest average loss to the self-check out system; and b) determining how many items to audit based on a statistical decision analysis applied to self shopping if step a) determines the customer should be audited.

14. In a self-check out system, a method of determining the average loss for a customer in a self-check out, comprising the steps of:

a) identifying a plurality of factors including store busy; level of audit (full, patial, none) and affecting the self-check out;

b) selecting a at least one of the plurality of the events; and c) calculating the average loss for the customer in the self-check out using a Bayes' loss factor based upon the selected at least plurality of events.

15. A self-service shopping checkout system for enhancing the accuracy and reducing overall audit level while achieving a lowest average loss of a self-checkout by a customer, comprising:

a) means for registering a plurality of items by the customer using a portable terminal;

b) means for determining if the customer is to be audited to obtain the lowest average loss for the customer using statistical decision analysis;

c) means for determining, as a function of a plurality of input criteria, which items n and the number thereof to be scanned;

d) means for selecting from the shopper's cart of items presented for purchase n items to be scanned;

e) means for properly scanning a bar code located on each of said n items selected for scanning; and f) means for allowing the shopping transaction if each item selected for scanning is present on a list of self-scanned items compiled by the shopper.

16. The system of claim 15 further comprising:

a) means for disallowing the transaction if any item selected for scanning is not present on the list of self-scanned items compiled by the shopper.

17. An article of manufacture, comprising:

a computer usable medium having computer readable program code means embodied therein for enhancing the accuracy and reducing overall audit level while achieving a lowest average loss of a self-checkout by a customer in a self-check out system including a plurality of portable self-checkout devices, each of said self-checkout devices to be used by a customer to scan a bar code located on an item to be purchased so as to record therein a list of such items to be purchased, each of said devices comprising bar code scanning means for scanning and decoding a bar code located on an item to be purchased and means for compiling a list of items scanned by said customer, the computer readable program code means in said article of manufacturing, comprising:

(a) computer readable program code means for registering a plurality of items by the customer using a portable terminal;

b) computer readable program code means for determining if the customer is to be audited to obtain the lowest average loss for the customer using statistical decision analysis;

c) computer readable program code means for determining, as a function of a plurality of input criteria, which items n and the number thereof to be scanned;

d) computer readable program code means for selecting from the shopper's cart of items presented for purchase n items to be scanned;

e) computer readable program code means for properly scanning a bar code located on each of said n items selected for scanning; and f) computer readable program code means for allowing the shopping transaction if each item selected for scanning is present on a list of self-scanned items compiled by the shopper or disallowing the transaction if each item selected for scanning is not present on the list of self-scanned items compiled by the shopper.

* * * * *